May 23, 1950

T. W. BONNER 2,508,562

POSITION LOCATING METHOD

Filed Oct. 10, 1944

INVENTOR.
T. W. BONNER

BY William D. Hall.

ATTORNEY

UNITED STATES PATENT OFFICE 2,508,562

POSITION LOCATING METHOD

Tom W. Bonner, Belmont, Mass., assignor, by mesne assignments, to the United States of America as represented by the Secretary of War Application October 10, 1944, Serial No. 558,013

1 Claim. (Cl. 343—5)

This invention relates to position locating methods and more particularly to position locating methods determined by the use of a plan-position indicator system.

A plan-position indicator system is one in which the indicating means, such as a cathode ray oscilloscope, shows a plan view of a particular area in polar co-ordinates relative to the position of said system. It will be understood however that the present invention is also applicable to indicating systems which provide indications according to other references such as rectangular co-ordinates.

Due to the fact that it is frequently necessary to bomb through overcast, it is an object of this invention to provide a means whereby precision bombing may be accomplished without optical reference to the target.

It is a further object of this invention to provide a means whereby the momentary position of a plane relative to the terrain over which it is flying may be graphically or photographically recorded and identified for comparison use on subsequent flights.

Further objects and advantages of the invention will be apparent from the following description, read in conjunction with the appended drawings.

Figure 1:
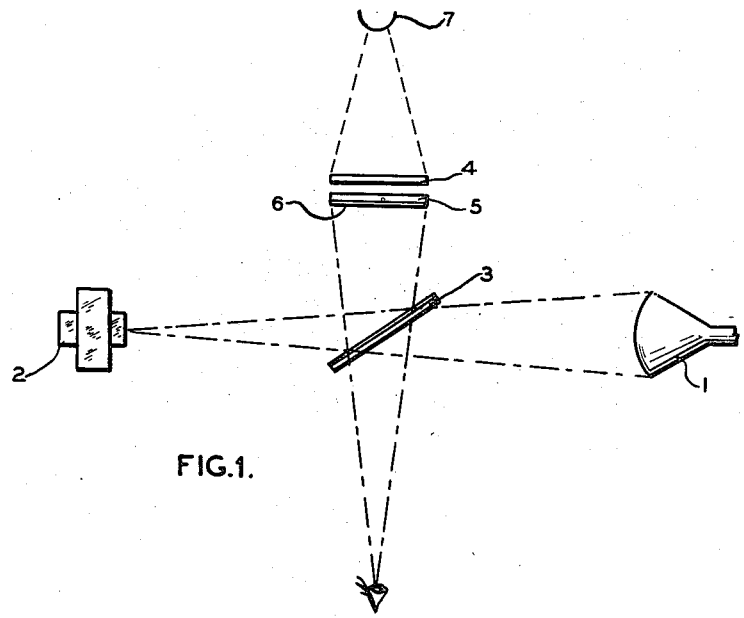
Figure 1 represents a schematic view of my invention arranged for use during reconnaissance.

Referring to Figure 1, tube 1 is a plan-position indicator tube, hereinafter referred to as a PPI tube. Camera 2 may be any standard camera having a fast shutter action. Mirror 3 is a half silvered mirror, both sides of which will reflect. Glass 4 is a focusing screen; glass 5 is a focusing glass, on one side of which is placed an opaque coating 6. Light source 7 may be any convenient source.

As heretofore stated, one of the objects of this invention is to obtain a permanent record of data so that the position of a plane on a subsequent flight may be determined by comparison with the recorded data. This data is obtained by use of the arrangement disclosed in Figure 1 of the appended drawing. On a reconnaissance flight, the observer can observe the face of the PPI tube 1 by reflection from mirror 3. Light from the PPI tube 1 will also pass thru the half silvered mirror 3 to the camera 2, allowing a photograph of the tube face to be taken when desired. Light from light source 7 will normally be blocked off by the opaque coating 6 on glass 5. At the moment when the plane is over the target, the observer may make suitable identifying marks on coating 6, thus removing the coating and allowing light from source 7 to pass thru mirror 3, allowing the observer to check his markings. The remainder of the light will be reflected by the mirror and be directed to camera 2. A photograph taken at this time will record the face of the PPI tube 1, superimposed upon which will be the markings on glass 5.

Figure 2:
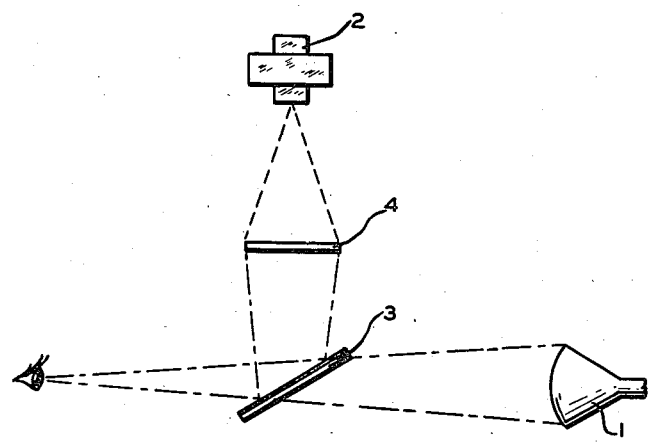
Figure 2 represents a schematic view of my invention arranged for use during a bombing run.

The manner in which this photograph will be used is shown in Figure 2. Camera 2 now functions as a projector, casting an image of the previously taken photograph upon mirror 3. Superimposed upon this image will be the changing pattern of the PPI tube 1. When the image and the pattern correspond, the plane will be over the target and in bombing position.

While there has been described what is at present considered a preferred embodiment of the invention, it will be obvious to those skilled in the art that various changes and modifications may be made therein without departing from the invention, and it is, therefore, aimed in the appended claim to cover all such changes and modifications as fall within the true spirit and scope of the invention.

I claim:

Apparatus for producing an identifying photograph of a target area, comprising an indicator of an object detection system, having a target area image thereon, a camera disposed to take a picture of the image on said indicator, a transparent element having an opaque coating on one side, said coating being adapted to be removed in part to provide transparent identifications of indications shown on said indicator, a semi-transparent mirror, a light source from which light may pass through said transparent identifications onto said mirror, said mirror being located at the junction of a line drawn between said indicator and said camera and a line drawn between said transparent element and the eye of an observer, so that light is reflected from said light source to said camera and said observer, whereby the observer may view the reflected image of the indications on said indicator and said transparent element simultaneously in order that identifying marks may be correctly placed on the latter, and, while being viewed by the observer, a photograph may be taken of said identifications and of the indications on said indicator.

TOM W. BONNER.

(References on following page)

REFERENCES CITED

The following references are of record in the file of this patent:

UNITED STATES PATENTS

| Number | Name | Date |
|---|---|---|
| 2,210,090 | Lutz et al. | Aug. 6, 1940 |
| 2,231,929 | Lyman | Feb. 18, 1941 |
| 2,323,534 | Goddard | July 6, 1943 |
| 2,406,751 | Emerson | Sept. 3, 1946 |
| 2,428,427 | Loughren | Oct. 7, 1947 |

FOREIGN PATENTS

| Number | Country | Date |
|---|---|---|
| 856,256 | France | June 10, 1940 |